April 17, 1934.   R. ZANIBONI   1,954,973

PROCESS OF PRODUCING PURE LIQUID AMMONIA FROM AMMONIA LIQUOR

Filed July 23, 1932

Inventor:

Renato Zaniboni

Patented Apr. 17, 1934

1,954,973

UNITED STATES PATENT OFFICE 1,954,973

PROCESS OF PRODUCING PURE LIQUID AMMONIA FROM AMMONIA LIQUOR

Renato Zaniboni, La Spezia, Italy

Application July 23, 1932, Serial No. 624,343
In Italy July 28, 1931

4 Claims. (Cl. 23—193)

This invention relates to a process of producing pure, anhydrous liquid ammonia from the ammonia liquor obtained in the distilling of fossiles without movable mechanical means for the compression and liquefaction of the ammonia itself, i. e., entirely by the chemical actions and reactions taking place in the purification of the ammonia. The process is based on the ammonia absorbing properties of substances such as water, ammonium sulphocyanide ammonium cyanide and others, which, when reheated after the absorption, liberate the ammonia and allow it to be separately condensed.

Figure 1:
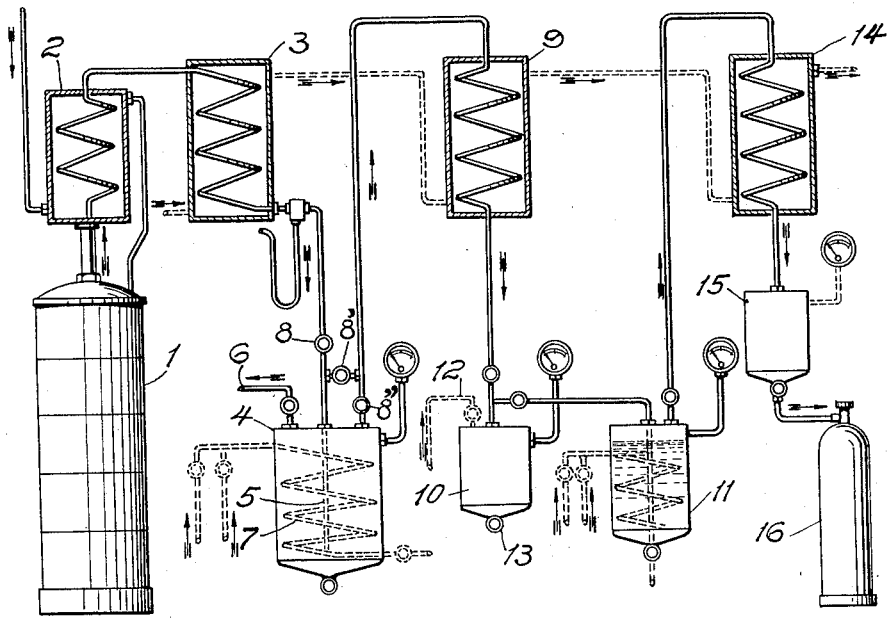
Figure 2:
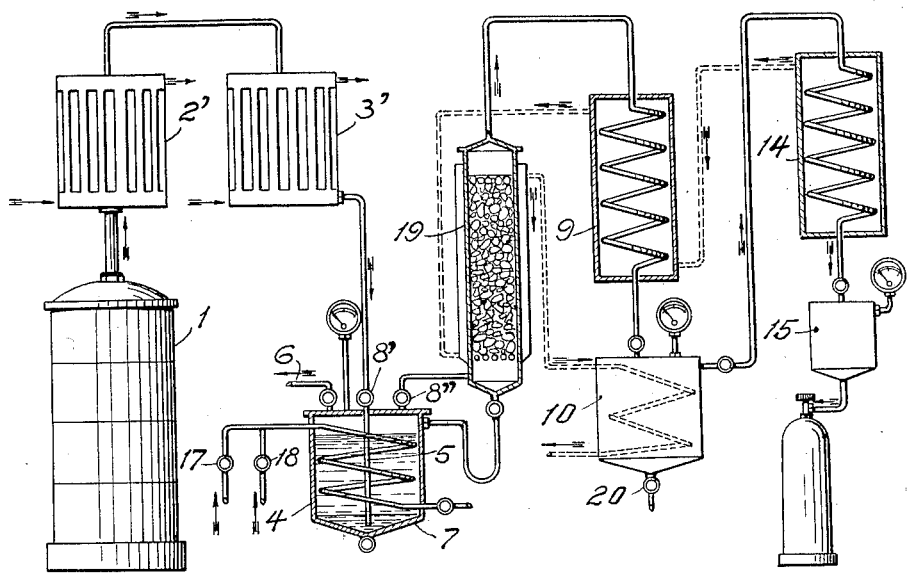

The invention is illustrated in the accompanying drawing,

Figs. 1 and 2 of which represent diagrams of different combinations of apparatus.

According to Fig. 1, the ammonia liquor obtained from the distillation of fossiles, are in their turn distilled in a lime column 1 such as employed in gas works for the production of ammonium sulphate. The vapours and the gases given off in the upper part of the column are cooled in a dephlegmator 2 superposed on the column 1. In this dephlegmator the steam will be condensed, and while the condensate flows back into the column, the gases pass on into a cooler 3 where their cooling will be completed. The cold gases which leave the cooler 3 contain ammonia liquor, empyreumatic oils and traces of sulphuretted hydrogen, carbonic anhydride, cyanic acid, and other impurities. In this condition the gases enter an absorbing apparatus 4 through a dipping pipe 5 and bubbles up through water contained in the apparatus. Gases which are not absorbed (mostly air) escape through a pipe 6.

The most important phase of the process is enacted in the apparatus 4 since nearly all of the ammonia will be retained in the absorbent. The absorption of the ammonia may, as an alternative, be effected through the medium of chemical compounds having a strong affinity for ammonia and none for the accompanying impurities, for instance ammonium sulphocyanide, ammonium cyanide, ammonium nitrate, ammonium iodide and iodine. Also in this case a large portion of the impurities ($H_2S$, $CO_2$ etc.) will remain unabsorbed.

Heat is developed during the absorption, and the absorbing apparatus is therefore provided with a heat exchanger in the form of a pipe coil 7 through which cold water is circulated.

When the absorbing substance contained in the apparatus 4 is saturated with ammonia, the apparatus is connected up with a condensing system through the medium of valves 8, 8', 8'', and the apparatus 4 is thereupon reheated through the medium of steam fed through the heat exchanger 7.

The ammonia is then liberated in the form of gas and sets up pressure in the apparatus until, having reached the condensation tension (a function of the temperature prevailing in the system) it passes in liquid form into a condensing apparatus 9 where it is cooled by means of a water spray whereupon it flows into a reservoir 10 arranged to receive it.

The ammonia thus obtained is not pure, part of the impurities having been driven off together with it.

In order to purify the ammonia the reservoir 10 is set in communication with a second absorbing apparatus 11. In this apparatus the ammonia is distilled without the application of heat, since, owing to the physical characteristics of anhydrous ammonia, the latter vapourizes at the expense of the external heat until the liquid is exhausted.

Owing to the low temperature attained by the liquid containing the impurities in solution, having been partly salified together with some of the ammonia, the impurities will be unable to distil off and decompose and will remain in the apparatus 10 after all the liquid ammonia has disappeared. When the impurities have accumulated in sufficient quantities, they may be discharged through a valve 13 arranged at the bottom of the apparatus 10.

The ammonia has at the same time been absorbed in the second absorbing apparatus 11 which, instead of water, may contain one of the absorbing salts referred to. Here the ammonia, which is perfectly pure and anhydrous, is again distilled and then condensed in an apparatus 14 whereupon it passes into a reservoir 15 and finally into a collecting flask 16.

The second absorbing apparatus 11 may also contain water instead of absorbing chemicals. In this case it will be advantageous to introduce a dephlegmator or separator between the second absorbing apparatus and the condensing apparatus in order to eliminate small quantities of water which may be driven off together with the liquid ammonia.

Should it be desired to produce caustic alkali instead of anhydrous ammonia, the crude ammonia which is re-distilled in the apparatus 10, may be discharged direct in the cold water.

The cooling effect produced in this evaporation can be partly utilized in the cooling of the solution.

Several apparatus may be arranged in series or parallel for continuous working.

The diagram in Fig. 2 shows how the process can be carried out in a more simple and economic manner by employing water alone as absorbent, other means being employed preliminarily for the removal of the impurities. The process already described makes it possible without deviation from the characteristics thereof, to obviate the second absorption step. This is effected by the introduction of a simple dephlegmator between the absorbing apparatus and the condensing apparatus. This dephlegmator, which may be composed of a column filled with coke or filling rings and may be cooled by water circulation, may assume the character of a true and proper rectifying or dephlegmation column, i. e., the vapours leaving the absorbing apparatus may be led into a column provided with pressure resistance, operating by the blowing of the vapours in the liquid, or by superposed discs which are cooled by adjustable means so as to effect, on the bottom discs, a condensation of all the vapours which retain the impurities and which can be retained in the absorbing apparatus or otherwise recovered, while the ammonia may be extracted either in liquid or gaseous form in the upper discs. The modified and simplified process may be carried out according to the diagram in Fig. 2 as follows:

The ammonia liquor is distilled in the lime column 1 from which the vapours and the residual gases pass into the dephlegmator 2' arranged above the column. The steam is condensed in the dephlegmator 2', and the condensate flows back into the column 1 while the gases pass into the condensing apparatus 3' where they are completely cooled. The cold ammonia containing gases, empyreumatic oils and other impurities, pass from the condensing apparatus 3' successively into the absorbing apparatus 4 which contains water as the absorbent. The gases are delivered through a pipe 5 and bubble up from the latter through the water which retains all the ammonia together with the residual impurities. The non-absorbed gases escape through the valve 6. The absorption of the ammonia in the water produces heat which is eliminated by cold water fed into the pipe coil 7 through a valve 17. When the water is saturated with ammonia, the absorbing apparatus is connected, by means of the valves 8', 8'', 6 with the condensing system, and the water is heated by steam fed through the coil 7 from the valve 18. The ammonia is then liberated in the form of gas, and pressure is produced until the gas reaches the condensation tension, and it then passes through the dephlegmator 19 into the condensing apparatus 9 in the form of a crude liquid ammonia which is collected in a reservoir 10.

The condensing apparatus eliminates almost completely the impurities and also the steam which is driven off together with the ammonia of the absorbing apparatus by the reheating. It is thus possible to obtain by means of the simplified apparatus a liquid ammonia with a purity of 99%. However, when a chemically pure product is required, the arrangement shown in Fig. 1 will have to be resorted to.

Also in the latter instance several absorbing apparatus 4 may be arranged in series or parallel for the continuous production of liquid ammonia on a commercial scale. The different condensing apparatus may be connected in series, as indicated in the drawing, for water circulation.

The apparatus 19 and 9 may be combined into a single column for dephlegmatic rectification. With the arrangement shown in Fig. 1 a 99% ammonia will be obtained during the first stage of the treatment, and the second stage need not be carried out unless chemically pure ammonia is required.

I claim:

1. A process of producing pure liquid ammonia from ammoniacal gases, comprising leading the gases through a cooled ammonia absorbent, heating the absorbent within a closed condensing system until the driven off ammonia gas liquefies under the resulting pressure, and cooling the resulting liquid ammonia.

2. A process of producing pure liquid ammonia from ammoniacal gases, comprising passing the gases through a cooled ammonia absorbent, heating the absorbent within a closed condensing system until the driven off ammonia gas liquefies under the resulting pressure, vapourizing the liquid ammonia, and repeating the absorption and the condensation steps to obtain chemically pure liquid ammonia.

3. A process of producing pure liquid ammonia from ammoniacal gases, comprising leading the gases through a cooled water bath for absorption, heating the water bath within a cooled condensing system until the driven off ammonia gas liquefies under the resulting pressure, and cooling the resulting liquid ammonia.

4. A process of producing pure liquid ammonia from ammoniacal gases, comprising leading the gases through cooled ammonia-absorbing chemicals, heating said chemicals within a closed condensing system until the driven off ammonia gas liquefies under the resulting pressure, and cooling the resulting liquid ammonia.

RENATO ZANIBONI.